May 4, 1948.　　　J. G. JACKSON　　　2,440,824
ELECTRICAL PANELBOARD
Filed Jan. 28, 1944　　　2 Sheets-Sheet 2
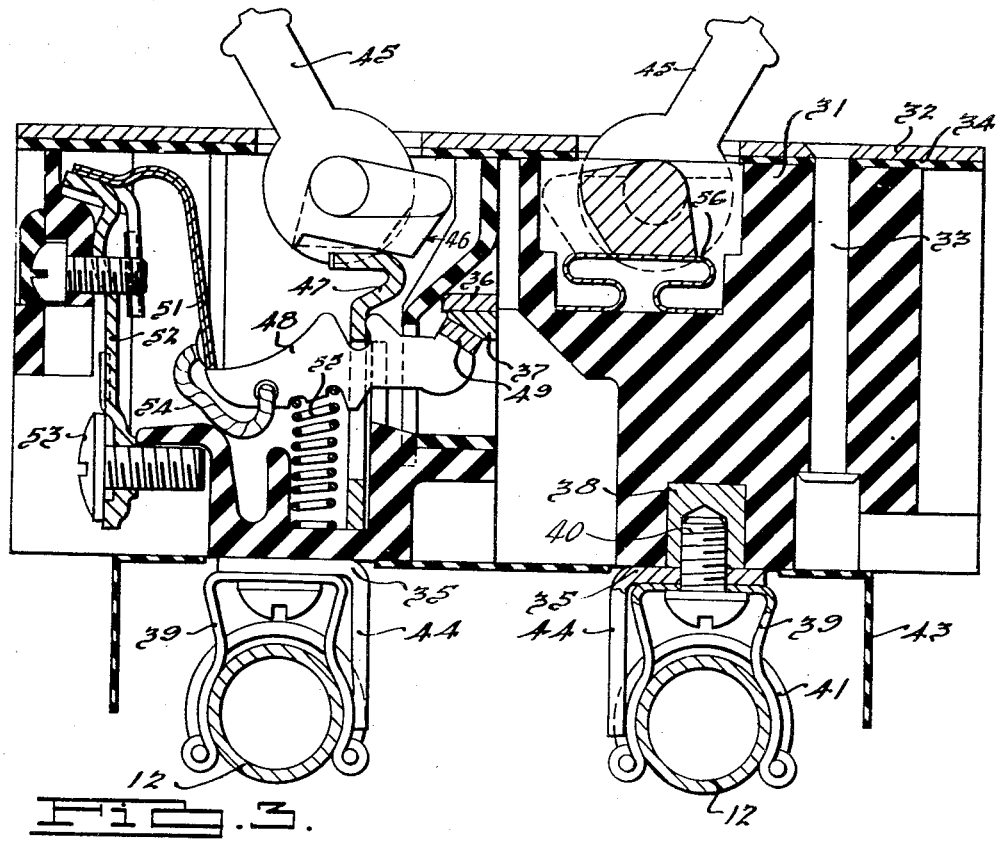
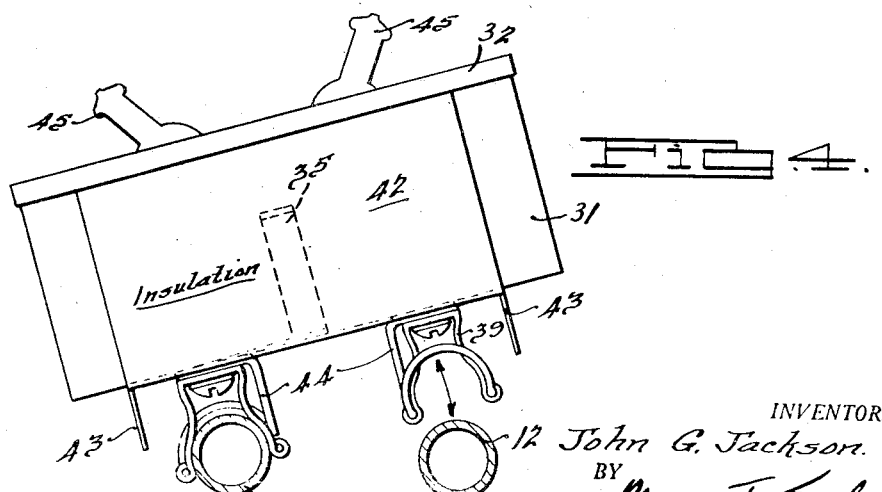
INVENTOR.
John G. Jackson.
BY
ATTORNEY.

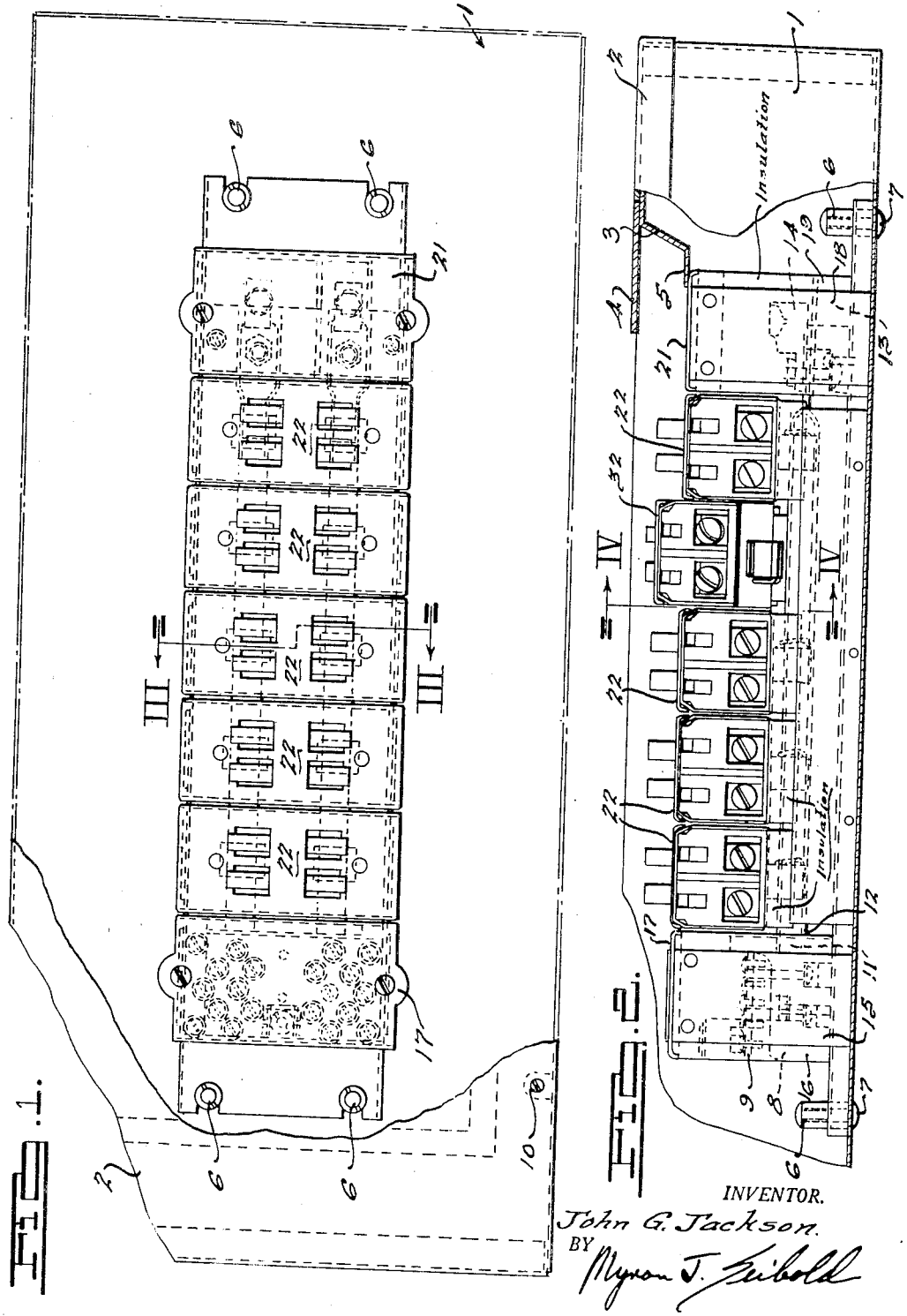

Patented May 4, 1948

2,440,824

UNITED STATES PATENT OFFICE 2,440,824

ELECTRICAL PANEL BOARD

John G. Jackson, Detroit, Mich., assignor to Square D Company, Detroit, Mich., a corporation of Michigan Application January 28, 1944, Serial No. 520,010

7 Claims. (Cl. 175—308)

This invention relates to an electrical panelboard and has for its object the provision of a panelboard in which the individual circuit controlling units are mounted to the bus conductors by a simple clip attachment which permits their ready attachment and removal without the manipulation of attaching screws.

Another object of the invention is to provide a panelboard mounting in which the circuit controlling units may be swiveled about their connection with a bus conductor and will remain mounted in swiveled condition to facilitate access to manipulable parts for the connection of circuit wiring.

Other objects and features of the invention will be readily apparent to those skilled in the art from the specification and appended drawings illustrating certain preferred embodiments in which:

Figure 1 shows a front elevational view of a panelboard in accordance with the present invention with part of the box and cover broken away to show internal parts.

Figure 2 is a side elevational view of the panelboard of Figure 1 with the box and cover broken away and with one of the circuit controlling units shown in outwardly swiveled position where access to circuit terminals is facilitated.

Figure 3 is a sectional view on the lines III—III of Figure 1.

Figure 4 is a detail view on the lines IV—IV of Figure 2, showing the outwardly swiveled controlling unit in elevation.

The panelboard, according to the present invention, comprises a sheet metal box 1 having a trim cover 2 normally attached thereto and having inwardly and backwardly projecting angles 3 rigid therewith and cooperating with the units within the box to prevent access to conducting parts. A central cover 4 is hinged within the trim cover and when opened provides access only to the manually operable handles which effect the switching and resetting of the circuit controlling instrumentalities. The trim cover 2 is mounted upon the box by studs 10 and must be removed to permit access to current conducing parts therebehind.

The current controlling elements and their connections are mounted within the box 1 as a unit upon a channel 5 which is mounted adjacent its top and bottom ends by nuts 6 threaded on studs 7 rigid with the back wall of the box, the nuts 6 being provided with grooves received in slots in the top and bottom edges of the channel 5 and providing means for adjusting its position with respect to the rear wall of the box. Adjacent the bottom edge of the channel is mounted an insulating block 8 carrying a conducting plate 9 provided with a plurality of terminal screws providing for the attachment of neutral conductors. The top wall of the block 8 is provided with the spaced openings indicated at 11 within which are supported the ends of the bus conductors 12, which are shown to be of hollow tubular construction. Adjacent the upper end of the channel 5 is an insulating block 13 and the ends of the tubular bus conductors 12 are flattened and mounted on the front surface of the block 13 in the same spaced relation as the lower ends of the bars and are there provided with connectors 14 for the reception of main conductors. A pair of metallic brackets 15 carry insulating sheets 16 and support a removable front wall 17 to enclose the neutral plate 9 and its connections. Similarly, a pair of metallic bracket plates 18 support insulating sheets 19 and carry a removable front wall 21 enclosing the connection for the mains to the bus conductors.

Between the blocks 8 and 13 and the enclosures there-around are mounted a plurality of circuit controlling units comprising the panelboard and indicated generally at 22. Each of these circuit controlling instrumentalities in the specific form of the panelboard illustrated comprises four automatic circuit breaker poles arranged in pairs of opposite polarity, with the contacts of each pair arranged to be connected to one of the bus conductors.

Each of the current controlling units comprises an insulating base 31 (Figure 3) having a metallic cover 32 secured thereto as by rivets 33, with a thin insulating sheet 34 disposed between the cover plate 32 and the insulating base 31. On the back wall of each unit are secured conducting elements 35 which extend forwardly along the opposite side walls of the units and through openings therein into the interior of the base 31 where they terminate in portions 36 insulated from each other and each carrying a pair of contacts 37. The conducting elements 35 are mounted on the back wall of the base by studs 40 threaded into inserts 38 and which also support, in electrically conducting relation with the electrical conductors 35, clips 39 which are provided with spring reinforcing elements 41 to increase their pressure upon bus conductors 12. The clips 39 are similar to the clips commonly utilized to receive the ferrules of cartridge fuses.

A U-shaped insulating sheet 42 is received about the side and back walls of the units to insulate the side and the main back portion of the conducting elements 35, and has end sections 43 bent rearwardly to provide insulating barriers at the ends of the panel units. The U-shaped insulating sheet 42 is maintained in place by the crimped-over edges of the covers 32 of the units, as shown in Figure 2. Conducting elements 35 are provided with rearwardly extending portions 44 alongside of the clips 39 to rigidify and strengthen the construction and prevent damage to the clips upon the attachment and swiveling of the breaker units.

Each pole of the circuit breaker comprises an insulating handle 45 having a cam surface indicated at 46 which slides against the surface of a plunger plate 47 to effect rectilinear movement of the plate upon rotary movement of the handle. A switching blade 48 has a notch therein pivotally interlocking with a slot in the plunger plate 47 and pivots thereon upon automatic and reset movement of the plunger plate 47. The switching blade 48 carries a contact 49 cooperating with the contact 37. The opposite end of the switching blade 48 is normally latched by a bimetallic member 51 adjustably carried upon a conductor 52 which extends to the exterior of the base 31 and there carries a terminal 53 for the reception of branch circuit wiring. A flexible lead 54 connects the free end of the bimetal 51 and the switch blade 48. A spring 55 is provided to bias the switching blade 48 away from the back of the base 31.

The operation of each of the breaker poles is effected manually by the rotation of the handle 45 which causes the plunger plate 47 to move rectilinearly toward and away from the back of the base, this effecting movement of the contact 49 away from and toward the contact 37, the switch blade 48 in this operation pivoting about its latching engagement with the bimetallic member 51. Upon the occurrence of a current overload through any breaker pole, the associated bimetallic member 51 will flex in a clockwise direction to release the latched end of the switch blade 48 which will thereafter rotate in a clockwise direction about its pivotal engagement with the plunger plate 47 under the action of the spring 55, to thus effect movement of the contact 49 away from its cooperating stationary contact 37. To thereafter reset the breaker mechanism, the handle is first moved to the "off" position whereupon the end of the switching blade 48 is again placed in latching relation with the bimetallic member 51, after which movement of the handle to the "on" position will place the parts in the closed circuit position shown in the left pole of Figure 3.

A light spring 56 is shown in the fragmentary right hand pole of Figure 3 and this bears on the handle to maintain it in a definite position in the "on" position of the breaker. Upon the automatic opening operation, the spring 55 is sufficiently strong to overcome the bias of the spring 56 whereupon the handle is moved beyond its normal "on" position to provide a position indicating the automatic tripped condition of the breaker.

In the panelboard according to this invention it is seen that provision is made for the ready mounting of the circuit controlling the units upon the bus conductors through the engagement of clips with these conductors whereby the units may be assembled and disassembled without the manipulation of screws or other electrical or mechanical connecting means for the units.

Provision is further made for the tilting or swiveling of the units to facilitate ease of attachment of the branch circuit wiring to the connectors 53. The tilted position of the unit is shown in Figure 2 and also in Figure 4, in both of which the unit has been tilted in a counterclockwise direction and is now solely supported on the bus conductor 12 at the left, making the terminal screws 53 at the right hand end of the breaker unit more readily accessible for manipulation and the attachment of circuit wiring. Similarly, for the exposure of the terminal screws at the opposite end of the breaker, the unit is tilted or swiveled in a clockwise direction as viewed in Figure 4, and is supported upon the right hand bus conductor 12 in the reversely tilted position to that shown.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

What is claimed is:

1. An electrical panelboard comprising a plurality of bus conductors having exterior cylindrical surfaces, a plurality of circuit controlling units mounted in front of said bus conductors in superposed relation, resilient, frictional clips on said units connected to the circuit controlling poles within the units and engageable with said bus conductors to electrically connect the circuit controlling units to the conductors, said clip and cylindrical bus conductor arrangement providing for swiveling of units about individual bus conductors while otherwise retained in place in the panelboard to provide access to the outwardly tilted end of the unit for manipulation.

2. An electrical panelboard comprising a plurality of bus conductors having exterior cylindrical surfaces, a plurality of circuit controlling units mounted in front of said bus bars in superposed relation, resilient, frictional clips on said units forming the line terminals thereof and adapted to engage with said bus conductors to electrically connect the circuit controlling units in the panelboard, said units being mountable in the panelboard with a single clip engaging its cylindrical bus conductor so that the unit is tilted forwardly with respect to the plane of the panelboard to provide access thereto for manipulation.

3. An electrical panelboard comprising a plurality of bus conductors having exterior cylindrical surfaces, a plurality of automatic electric circuit breaker units mounted in front of said bus bars in superposed relation, each of said circuit breaker units including manual and automatic means for effecting the switching operation, resilient, frictional clips on said circuit breaker units engageable with said bus conductors to mechanically and electrically mount the units in the panelboard, said clips being connected to the poles of the circuit breaker units, the clip and cylindrical bus conductor arrangement providing for manual manipulation of the units to tilt one end thereof forwardly of the plane of the panelboard while the unit is maintained in place by the clip and conductor connection about which it is swiveled whereby access to the forwardly tilted end of the unit is provided for.

4. An electrical panelboard comprising a plurality of bus conductors having exterior cylindrical surfaces, a plurality of automatic electric circuit breaker units mounted in front of said bus bars in immediately contiguous superposed relation, each of said circuit breaker units including poles of different electrical polarity, each of said poles including automatic and manual means for effecting the switching operation, resilient, frictional clips at the back of said circuit breaker units connected to said poles and engageable with said bus conductors to mechanically and electrically mount the units in the panelboard, said units being mountable in the panelboard tilted forwardly of the plane thereof with one clip engaging its associated bus conductor to support the unit, with the forwardly tilted end of the unit exposed for ready access.

5. An electrical panelboard comprising a plurality of bus conductors having exterior cylindrical surfaces, a plurality of automatic electric circuit breaker units mounted in front of said bus bars in superposed relation, said units having branch circuit terminals accessible from the ends thereof, line terminals for said units disposed at the back of the units comprising resilient, frictional clips and engageable with said bus conductors to electrically connect the units thereto, the frictional engagement between a clip and its associated bus conductor being sufficient to mechanically support a unit in the panelboard while it is swiveled or tilted forwardly of the plane of the panelboard for access to the branch circuit terminals for manipulation.

6. A circuit breaker panelboard unit having a plurality of means controlling circuits therein, resilient, frictional clips on the rear wall of said unit for connection to the bus conductors of a panelboard, and connectors extending from said clips forwardly along the side walls of the unit and extending therethrough into the interior of the unit for connection to the circuit controlling means, said connectors having extensions along the side of said clips for preventing injury thereto by manipulation.

7. A circuit breaker panelboard unit having a plurality of means controlling circuits therein, resilient, frictional clips on the rear wall of said unit for connection to the bus conductors of a panelboard, and connectors extending from said clips forwardly along the side walls of the unit and extending therethrough into the interior of the unit for connection to the circuit controlling means, said clip having an arcuate engaging surface adapted for association with tubular bus conductors, said clips being electrically and mechanically engageable with the panelboard bus conductors without requiring access to the interior of the circuit breaker unit.

JOHN G. JACKSON.

REFERENCES CITED

The following references are of record in the file of this patent:

UNITED STATES PATENTS

| Number | Name | Date |
| --- | --- | --- |
| 1,358,268 | Wadsworth et al. | Nov. 9, 1920 |
| 1,429,776 | Robinson | Sept. 19, 1922 |
| 1,693,303 | Mackintosh | Nov. 27, 1928 |
| 1,846,714 | Frank | Feb. 23, 1932 |
| 1,983,281 | Fries et al. | Dec. 4, 1934 |
| 2,038,107 | Harvey | Apr. 21, 1936 |
| 2,059,987 | Frank et al. | Nov. 3, 1936 |
| 2,146,812 | Frank | Feb. 14, 1939 |
| 2,217,511 | Catherwood | Oct. 8, 1940 |
| 2,226,088 | Anderson | Dec. 24, 1940 |
| 2,241,905 | Frank et al. | May 13, 1941 |
| 2,261,987 | Frank et al. | Nov. 11, 1941 |
| 2,319,415 | Lightfoot | May 18, 1943 |
| 2,359,247 | Rome | Sept. 26, 1944 |

FOREIGN PATENTS

| Number | Country | Date |
| --- | --- | --- |
| 247,289 | Great Britain | Feb. 15, 1926 |
| 424,215 | Great Britain | Feb. 18, 1935 |